United States Patent
Hibbard

[15] 3,665,466
[45] May 23, 1972

[54] DETERMINATION OF ICE THICKNESS
[72] Inventor: Haines C. Hibbard, Houston, Tex.
[73] Assignee: Esso Production Research Company
[22] Filed: Mar. 20, 1970
[21] Appl. No.: 21,325

[52] U.S. Cl............................343/12 R, 343/5 R, 343/13 R, 343/14 R, 324/4, 324/6
[51] Int. Cl..........................................................G01s 9/04
[58] Field of Search........................343/5 R, 12 R, 13 R, 14; 324/4, 5, 6

[56] References Cited

UNITED STATES PATENTS

| 3,122,720 | 2/1964 | Morse | 343/5 R X |
| 3,311,914 | 3/1967 | Barringer | 343/17.2 |
| 3,351,936 | 11/1967 | Feder | 343/5 R |

FOREIGN PATENTS OR APPLICATIONS
805,281  1/1969  Canada

Primary Examiner—T. H. Tubbesing
Attorney—James A. Reilly, John B. Davidson, Lewis H. Eatherton, James E. Gilchrist, Robert L. Graham and James E. Reed

[57] ABSTRACT

The thickness of sea ice is measured using a radar technique with radio frequency energy having frequency in the range between a frequency below 2000 MHZ and a frequency above 4000 MHZ. The penetration of radio frequency energy transmitted from above the ice and reflected by the ice or the water below it depends on the frequency of the energy. The frequency may be swept over the above range and the travel time of reflected energy recorded to obtain a measure of the salt concentration in ice.

6 Claims, 4 Drawing Figures

INVENTOR.
HAINES C. HIBBARD
BY John B Davidson
ATTORNEY

*INVENTOR.*
HAINES C. HIBBARD

BY *John B Davidson*

ATTORNEY

DETERMINATION OF ICE THICKNESS

BACKGROUND OF THE INVENTION

This invention relates generally to measurement of ice thickness and more particularly to a technique for measuring ice thickness using radio frequency electromagnetic energy.

The determination of the thickness of ice has recently assumed considerable importance in view of the passage of commercial vessels into Arctic and Antarctic regions where the sea is covered with a layer of ice either permanently or for extended periods during the year. In the Northwest Passage between the Arctic islands of Canada for example, a ship may be able to break through the ice provided that it is not excessively thick and provided also that the ice, if thick, is "old ice"; i.e., ice that has progressively accumulated over a period of years. It has been found that "old ice" becomes relatively hard and brittle and is much easier to break than is ice of relatively recent origin. Also, the presence of ice ridges becomes important in planning the travel path of a vessel inasmuch as they can present special problems to the captain of a vessel intent upon breaking through the ridge. It is desirable therefore to be able to quickly and accurately measure the thickness of the ice over a body of water and also to determine whether the ice is of relatively recent formation or whether it is "old ice".

SUMMARY OF THE INVENTION

In accordance with the teachings of the present invention, the thickness of ice at and near the surface of a body of water is measured by irradiating the ice from a position above the upper surface of the ice with radio frequency electromagnetic energy of frequency above 4000 megaHertz (MHZ). The travel time of waves reflected by the upper ice surface is measured. Also, the ice is irradiated with radio frequency electromagnetic waves at frequencies below 2000 MHZ and the two-way travel time of waves reflected at or near the lower ice surface is measured. The difference in travel time thus measured is utilized with the velocity of radio frequency waves in salt free ice to obtain the ice thickness.

More particularly, the upper surface of the ice may be irradiated with radio frequency waves at each of a multiplicity of frequencies between a frequency of less than 2000 MHZ (preferably 100 MHZ) and a frequency above 4000 MHZ. A first electrical signal is produced having an amplitude indicative of two-way travel time of waves reflected by the ice or the body of water for each of said multiplicity of frequencies. A second electrical signal is produced indicative of the rate of change of said first electrical signal. The duration of the second signal above a base amplitude is indicative of the two-way travel time of said radio frequency waves through the ice, and the magnitude of the signal is indicative of the rate of change of the salt content of the ice.

Objects and features of the invention not apparent from the above discussion will become evident upon consideration of the following detailed description of the invention which is to be taken by way of example and not in a limiting sense.

DESCRIPTION OF A PREFERRED EMBODIMENT OF THE INVENTION

Figure 1:
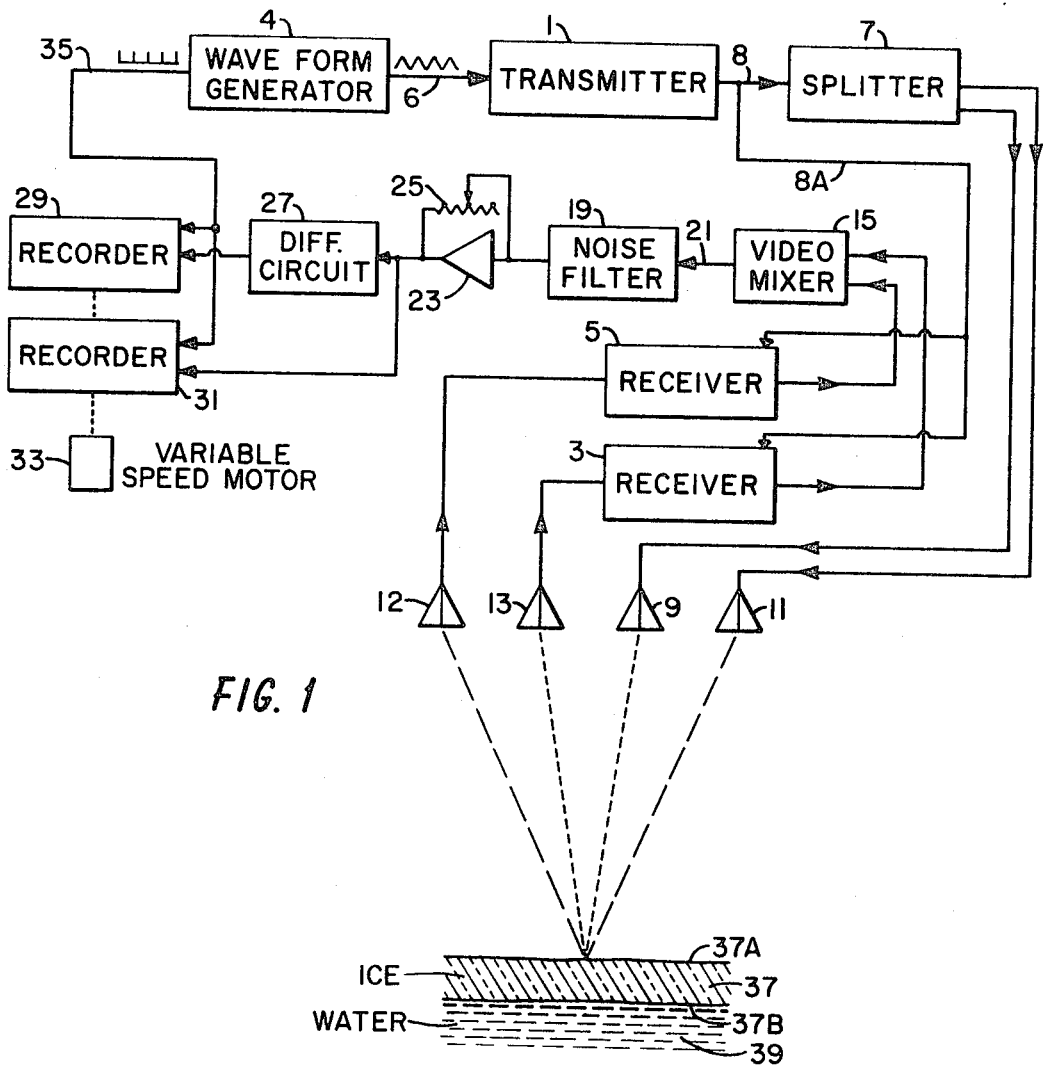
FIG. 1 is an electrical block diagram of a preferred apparatus for carrying out the invention.

With reference now to the block diagram of FIG. 1, there is illustrated a preferred embodiment for carrying out the invention utilizing a broad band radio frequency transmitter 1, preferably capable of being varied in frequency between about 100 MHZ and 4000 to 6000 MHZ or above. This transmitter may be a device of a type manufactured by Hewlitt Packard, Inc. of North Hollywood, California, and described on Page 327 of their 1970 Catalog. The Alfred Model 650 manufactured by Singer Instrumentation of Palo Alto, California may also be used. The frequency of the transmitter is controlled by a triangular wave form generator 4 adapted to produce a triangular shaped wave form on line 6 and a synchronized series of pulses on line 35. With each variation in the voltage on line 6 between a minimum and a maximum, the transmitter 1 varies in output frequency between a predetermined minimum frequency and a predetermined maximum frequency. As indicated above, the predetermined minimum frequency is preferably of the order of 100 MHZ and the predetermined maximum frequency is above 4000 MHZ. The output signals from transmitter 1 appearing on line 8 are simultaneously coupled to antennas 9 and 11 through a radio frequency splitter element 7, the function of which is to couple a plurality of antennas to a single radio frequency transmitter, when the antennas have different frequency characteristics. It is well known that an antenna will most efficiently respond to radio frequency signals of a given range or band of fundamental frequencies and to multiples of this band. The radiation efficiency of a given antenna will be greatest at some center frequency and harmonics of this center frequency and will progressively diminish as the frequency of the signals applied thereto vary from this central frequency and its harmonics. The antennas 9 and 11 are designed to respond with reasonable efficiency to different bands of frequencies but to compliment each other so that one antenna or the other will transmit signals from transmitter 1 with at least a desired degree of efficiency at substantially all frequencies within the band of frequencies being swept by the transmitter 1. For example, if antenna 11 should efficiently radiate frequencies within the band of 400 to 600 MHZ then the antenna 9 should efficiently radiate signals in the band of 600 to 800 MHZ. Since both antennae will also efficiently radiate signals that are multiples of the signals radiated by the fundamental bands, one antenna or the other will efficiently radiate signals at all frequencies above 400 MHZ. Antenna 13 is of the same design as antenna 9 and antenna 12 is of the same design as antenna 11 so that they efficiently respond to the same bands of frequencies. Antennae 12 and 13 respectively are coupled to receivers 5 and 3 which preferably are crystal video receivers of the type well know to the art, such as are manufactured by the Collins Radio Company of Cedar Rapids, Iowa. A portion of the output signals of transmitter 1 are coupled to the receivers 3 and 5 through line 8A. The signals appearing on line 8A are beaten against the signals coupled to the receivers from antennas 13 and 12 so that the output signal from receiver 3 will be the difference between the signals on line 8A and the signal from antenna 13 while the output signal from receiver 5 will be the difference between the signal on line 8A and the signal from antenna 12. The output signals from receivers 3 and 5 are coupled to a video mixer 15, the function of which is to produce an output signal on line 21 that is the sum between the signals from receivers 3 and 5. The video mixer may be a device such as described at Page 42 of Applications Manual for Computing Amplifiers by Philbricks Nexus Co. of Cambridge, Massachusetts (1966). The output signal from the video mixer appearing on line 21 is applied to a noise filter 19, the function of which is to eliminate any stray signals outside of the band of frequencies that are properly indicative of altitude within the range at which it is desired to operate the antennas 9, 11, 12, and 13. This noise filter may be a device such as manufactured by White Filters, Inc. of Austin, Texas. The output signal from the noise filter is applied to a calibrated scaling amplifier 23 having fixed gain steps, the gain of which is adjustable by suitably adjusting the taps on resistor 25. The function of the scaler amplifier is to permit adjustment of the scale range of the recorder. The output signal of the scaler amplifier is recorded by a recorder 31 which will be described below. The output of amplifier 23 is also applied to a differentiating circuit 27, which may be a device such as described at Page 48 of the aforementioned Philbrick Applications Manual, the function of which is to provide an output signal for recordation by recorder 29 that is the first derivative of the output signal from amplifier 23.

As indicated above, the wave form generator 4 produces not only a triangular wave form on line 6 but also produces a series of spike pulses on line 35 which are separated in time by a period equal to the duration of the triangular pulse wave form appearing on line 6. For example, a pulse may be produced at either the peak or the valley of the triangular pulse wave form. When the slope of the wave form changes either from negative to positive or from positive to negative, the pulses appearing on line 35 are applied to the recorder 29 and the recorder 31 to control the lateral sweep of the recording elements thereof. A number of suitable wave form generators are commercially available such as Model 114 manufactured by Wavetek of San Diego, California.

The recorders 29 and 31 may be devices such as are commercially available and manufactured by Submarine Signal Division of Raytheon Company of Portsmouth, R. I. designated as Model 191–C–1. The two recorders may be driven by a variable speed motor 33 connected to the recorders by mechanical gearing or other suitable means.

The apparatus described above preferably is mounted on an aircraft, such as conventional fixed-wing aircraft or a helicopter. Where it is desired to survey the thickness of ice over a large area or a long traverse, a fixed-wing aircraft would be more suitable. However, in certain instances it is desirable to delineate as precisely as possible certain localized area, such as ice ridges which may be of considerable thickness and which can present substantial obstacles to navigation. In such instances, a helicopter would be more suitable for use. The antennas used may be any of a number of types well known to the art. In some instances yagi or dished antennas having directive patterns are suitable. But, when it is desirable to operate the system at low altitude, ground loading may become a factor and dipole antennas will be found to be more suitable since dipole antennas can be operated over fairly wide bands of frequencies both at the fundamental and harmonics, the use of dipoles will also be most suitable when the number of pairs of antennas utilized is to be kept to a minimum.

The power output of the transmitter 1 is not particularly important as it is in more conventional horizontal ranging and detection applications since the transmitter 1 operates in the continuous mode rather than the pulsed mode, this fact is particularly desirable. It will be found that transmitters having an effective power output as low as ½ watt or lower, can be utilized in connection with the invention.

The operation of the apparatus described heretofore is as follows. It will be assumed that the apparatus is mounted on a fixed-wing aircraft and that it is desired to measure the thickness of the ice along a traverse to be followed by the aircraft. The apparatus is energized and the variable speed motor 33 is set at a desired speed which may be calibrated to correspond to the speed of the aircraft. At the beginning of a sweep of the voltage on line 6 the transmitter will be producing electromagnetic waves at its minimum frequency. As the voltage increases in value, the frequency of the electromagnetic waves produced by the transmitter and radiated by the antennas 9 and 10 will be rapidly increased. The energy initially transmitted downwardly will penetrate the ice layer and will be reflected by the water below the ice. The minimum frequency of the radio frequency waves generated by transmitter 1 is selected to be low enough so that the ice cannot possibly reflect the energy except where it has a very high salt content. Thus, the travel time of the radio frequency energy will be indicative of the distance of the antennas above the reflection level. The maximum frequency is selected to be high enough so that the waves will not penetrate the upper surface of the ice, as illustrated in FIG. 1. The energy picked up by antennas 12 and 13 are respectively applied to receivers 5 and 3. This energy is mixed with energy conveyed to the receivers 5 and 3 from transmitter 1. Thus, the difference in the frequencies is indicative of the two-way travel time between the antennas and the level in the ice from which the waves are reflected. The signal appearing at the output of video mixer 15 thus is indicative of the altitude of the antennas above the reflection level in the ice 37. Inasmuch as the frequency of the transmitter 1 is swept between its extreme ranges at a repetition rate of at least 30 sweeps per second, with each sweep there is produced a continuous output signal from the video mixer 15, the amplitude of which, when related to the frequency of transmitter 1, is indicative of the penetration into the ice of radio frequency waves produced by the transmitter at each and every instant of time. By recording the amplitude of the signal appearing on line 21 as filtered by noise filter 19 and amplified by scaler amplifier 25, as a trace lateral to the direction of movement of a recording medium at a recording rate that is high relative to the movement of the recording medium, there is produced a signal, as illustrated by record "A" of FIG. 4, the amplitude of which is indicative of ice thickness. The low frequency waves indicate the distance between the antennas and the lower surface of the ice and the very high frequency records indicate the distance between the antennas and the upper surface of the ice. The recording element of the recorder 31 is triggered back to its initial position by the pulses on line 35 so that the traces corresponding to each frequency sweep of transmitter 1 are recorded in side by side relationship laterally of the direction of movement of the recording medium. The speed of the recording medium is adjusted by varying the speed of motor 33 so as to be in accordance with the speed of the aircraft on which the apparatus is mounted.

Figure 4:
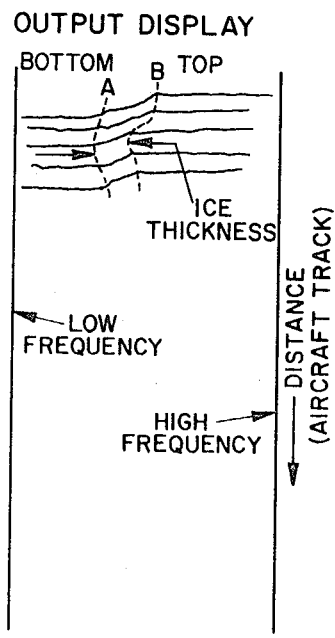
FIG. 4 is a strip recording such as would be produced by the recorder 31 of FIG. 1.
Figure 3:
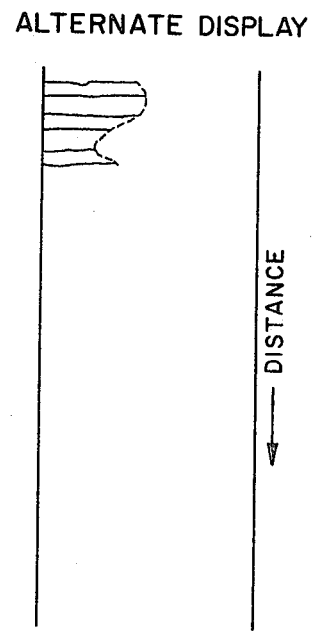
FIG. 3 is a strip drawing of a record such as would be produced by the recorder 29 of FIG. 1.

It can be seen from an inspection of FIG. 4 that changes in the amplitude of the recorded signal occur over the frequency interval of reflections from intermediate depths in the ice. Thus, when the frequency reaches a value such that the salt content of the ice begins to affect the depth to which the radio frequency waves can penetrate, the amplitude of the output signal from video mixer 21 begins changing and this is reflected in the recorded trace. Thus, by differentiating the output signal from amplifier 23 and recording it, a record as shown in FIG. 3 is made of the rate of change of the depth of penetration as a function of frequency which is not only indicative of the thickness but also is indicative of the salt content of the ice. By correlating the frequencies for the thickness measurement of FIG. 4 with the change in salt content measurement of FIG. 3, information can be obtained as to the salt content of the ice at various depths of the ice.

Figure 2:
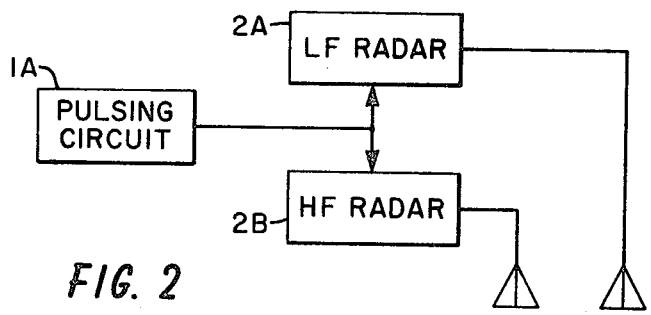
FIG. 2 is an electrical block diagram of another apparatus for performing the invention.

When it is desired to obtain only information as to the thickness of the ice the frequency of the transmitter can be shifted back and forth between a very narrow band of low frequencies and a very narrow band of high frequencies without sweeping the intermediate frequencies. The signal produced at the output of video mixer 21 and of amplifier 23 at the low frequencies, will be indicative of the height of the antennas above the water level and the signals produced at the high frequencies will be indicative of the height of the antenna above the upper ice surface. Alternatively, pulse radar type devices can be used, one set 2A operating at a low frequency and the other set 2B operating at a high frequency as illustrated in FIG. 2. The pulse radar systems can be of the conventional type producing very short bursts of radio frequency energy and measuring the reflection time thereof such as manufactured by Bonzer Incorporated of Kansas City, Kansas. The two radar sets will be pulsed concomitantly by a conventional pulsing circuit 1A and the output signals can be recorded on any of a number of recording devices such as oscilloscopes. The reflection time of waves from the low frequency radar set will be indicative of the height of the antenna thereof above the water level and the reflection time of energy produced and detected by the high frequency radar set will be indicative of the height above the antennas above the upper surface of the ice. Here again, the frequency of the low frequency radar set should be below 2000 MHZ and preferably in the vicinity of 500 MHZ while the higher frequency radar set should operate in the vicinity of 4000 MHZ or higher. When utilizing a pulse radar technique the height of the antennas thereof above the upper surface of the ice should be at least 40 feet and preferably 100 feet or greater.

What is claimed is:

1. A method of measuring the thickness of sea ice comprising:
   from above the ice, irradiating the upper surface of the ice with radio frequency electromagnetic waves of frequency above 4000 MHz and measuring the two-way travel time of waves reflected by the upper ice surface, and irradiating the upper surface of the ice with radio frequency electromagnetic waves of frequency below 2000 MHz and measuring the two-way travel time of waves reflected at or near the lower ice surface; and
   utilizing the difference in travel time thus measured and the velocity of radio frequency waves in ice to obtain the ice thickness.

2. The method of claim 1 wherein the frequency of the radio frequency waves is repetitively varied between a frequency less than 2000 MHz and a frequency above 4000 MHz.

3. The method of claim 2 wherein a record is made of two-way travel time for each of a plurality of frequencies between said frequency below 2000 MHZ and said frequency above 4000 MHZ.

4. The method of claim 2 wherein the frequency of the radio frequency waves is continuously varied in frequency.

5. In the measurement of the thickness of ice covering a body of water using radio frequency waves, the improved method of determining the travel time of radio frequency waves through the ice comprising:
   from a location above the ice, irradiating a portion of the upper surface of the ice with radio frequency waves at each of a multiplicity of frequencies between a frequency less than 2000 MHz and a frequency above 4000 MHz;
   producing a first electrical signal having an amplitude indicative of twoway travel time of waves reflected by the ice or the body of water for each of said multiplicity of frequencies;
   producing a second electrical signal indicative of the rate of change of said first electrical signal;
   the duration of said second signal above a given amplitude being indicative of the two-way travel time of said radio frequency waves through the ice, and the magnitude of the signal being indicative of the rate of change of salt content of the ice.

6. The method of claim 5 wherein the upper surface of the ice is irradiated with radio frequency waves continuously variable in frequency between said first and second frequencies.

* * * * *